(12) United States Patent
Bandak

(10) Patent No.: US 6,464,173 B1
(45) Date of Patent: Oct. 15, 2002

(54) PARADROGUE ASSEMBLY

(75) Inventor: Mike E. Bandak, Upland, CA (US)

(73) Assignee: Sargent Fletcher, Inc., El Monte, CA (US)

( * ) Notice: Subject to any disclaimer, the term of this patent is extended or adjusted under 35 U.S.C. 154(b) by 0 days.

(21) Appl. No.: 09/672,671

(22) Filed: Sep. 28, 2000

Related U.S. Application Data

(60) Provisional application No. 60/156,829, filed on Sep. 30, 1999.

(51) Int. Cl.$^7$ .............................................. B64D 37/00
(52) U.S. Cl. ................................... 244/135 A; 244/142
(58) Field of Search ........................ 244/135 R, 135 A, 244/113, 142, 152; 29/25

(56) References Cited

U.S. PATENT DOCUMENTS

| | | |
|---|---|---|
| 2,960,291 A | 11/1960 | Patterson |
| 2,998,949 A | 9/1961 | Patterson |
| 3,011,742 A | 12/1961 | Gross |
| 3,108,769 A | 10/1963 | Hieber |
| 4,927,099 A | 5/1990 | Emerson |
| 5,131,438 A | 7/1992 | Loucks |
| 5,255,877 A | 10/1993 | Lindgren |
| 5,393,015 A | 2/1995 | Piasecki |
| 5,427,333 A | 6/1995 | Kirkland |
| 5,573,206 A | 11/1996 | Ward |
| 6,145,788 A | * 11/2000 | Mouskis et al. ........ 244/135 A |

* cited by examiner

*Primary Examiner*—Charles T. Jordan
*Assistant Examiner*—Timothy D. Collins
(74) *Attorney, Agent, or Firm*—Edward A. Sokolski

(57) ABSTRACT

A paradrogue is formed from a canopy supported on a plurality of spaced apart struts running completely around the canopy. The remote ends of the struts have clip members which are attached to the bottom of the canopy. Separate nylon cords are used to interconnect adjoining struts by means of brackets which are fitted through loops at the end of the cords. The base end of the canopy is attached to a base support member by means of hooks formed on the bottom ends of the struts which engage a ring on the base support member.

7 Claims, 3 Drawing Sheets

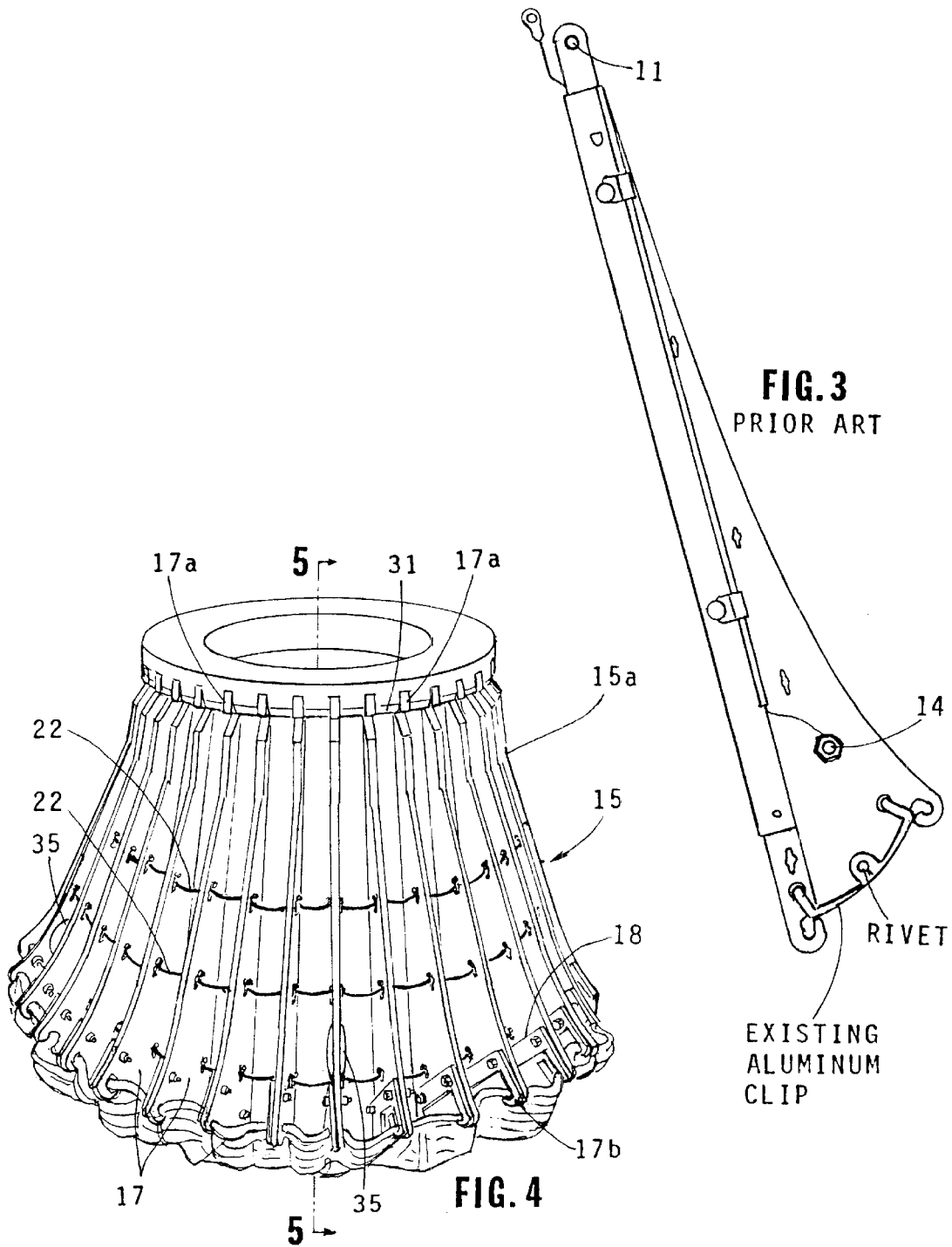

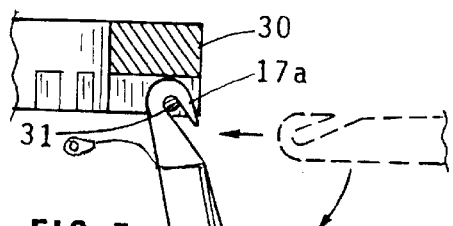
FIG. 5
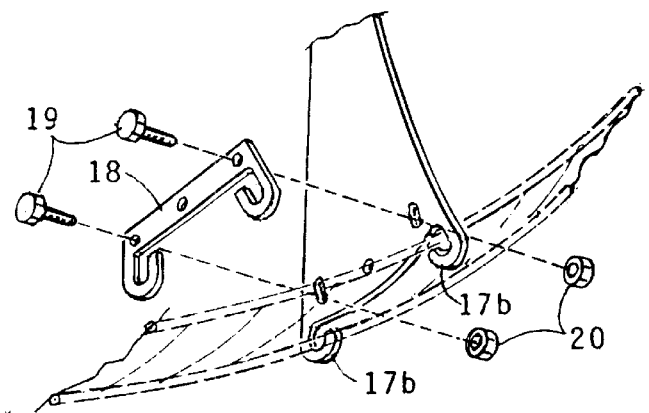
FIG. 6
FIG. 7
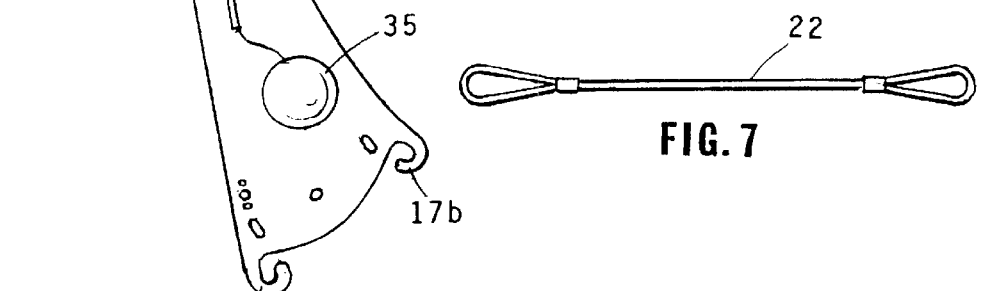
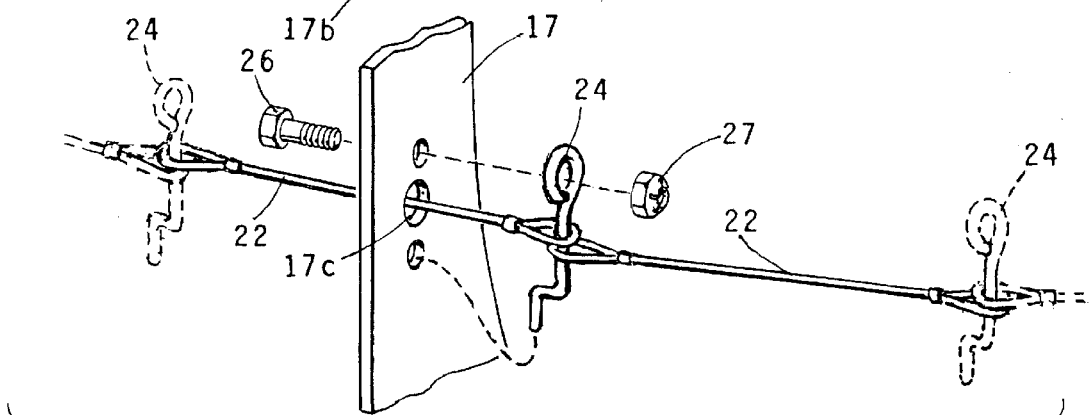
FIG. 8

PARADROGUE ASSEMBLY

Priority for this application is claimed based on Provisional Application no. 60/156,829 filed Sep. 30, 1999.

BACKGROUND OF THE INVENTION

1. Field of the Invention

This invention relates to the aerial refueling of aircraft and more particularly to a paradrogue assembly for use in such refueling.

2. Description of the Related Art

A paradrogue is an aerodynamic device attached to the refueling coupling at the end of a refueling hose. It serves the purpose of 1. creating the drag necessary to deploy the hose and interact with the hose reel response system and 2. stabilizing the reception coupling, thereby facilitating engagement with the refueling probe mounted on the receiving aircraft with the reception coupling.

Paradrogues of the prior art have the following shortcomings: First, due to variability in refueling probe design and construction, the drogue arms or struts are generally too long, creating an interference condition with the probe mast as shown in FIG. 1. Second, when the struts are damaged, the entire drogue must be completely disassembled to replace a single damaged strut. This is due to the manner in which the struts are attached to the inner and outer ring castings formed in the base assembly. As shown in FIGS. 2 and 3, and U.S. Pat. No. 2,998,949 issued Sep. 5, 1961 to Patterson, the ring 10 passes through the hole 11 at the end of each strut, making it necessary to disassemble the drogue to remove even a single damaged strut. Third, in the prior art designs, tri-ball steel cables 13 (See FIG. 2) are used to connect the struts to each other. In event of a structural failure in the drogue assembly, such cables can break loose and when loose present a hazard in that they can be ingested into the engine with consequent damage which could cause engine failure. Fourth, present designs employ exposed bulb type lights 14 for night operations as shown in FIG. 3 which are readily subject to being damaged.

SUMMARY OF THE INVENTION

The device of the present invention is universal and is compatible with all known refueling probe designs. It overcomes the shortcomings of the prior art first in that it has a shortened arm length which minimizes interference. Secondly, the device of the present invention is more easily maintained since repairs to replace damaged struts and the like can be performed without disassembling the entire drogue. Thirdly, damage to the aircraft's engine or other parts is lessened due to the replacement of tri-ball cables for interconnecting the struts by a connector not likely to cause damage should it come loose. Fourthly, a more robust canopy retaining device is utilized which minimizes breakage and damage induced failures often encountered with devices of the prior art. Finally, an improved lighting mechanism is employed which is less damage prone than the currently employed bulbs.

The device of the present invention employs a canopy which is supported on a plurality of spaced apart struts which run completely around the canopy. The remote ends of the struts have clip members formed thereon which are attached to the bottom of the canopy by means of brackets and screws. Cords which have loops at their opposite ends are used to interconnect adjacent struts to each other by engagement of the loop portions with support brackets. The base of the canopy is attached to a circular base support member which has a ring formed thereon, this end result being achieved by hooks formed on the struts which are hooked onto the ring.

It is therefore an object of this invention to provide an improved paradrogue assembly.

It is a further object of this invention to provide a paradrogue assembly which is less prone to damage than prior such devices.

It is still a further object of this invention to provide a paradrogue assembly which can be more readily be repaired than prior art such devices.

Other objects of the invention will become apparent from the following description in conjunction with the accompanying drawings.

DESCRIPTION OF THE DRAWINGS

FIG. 3 is a side elevational view showing a strut employed in prior art paradrogue assemblies;

FIG. 4 is a top side perspective view of a preferred embodiment of the present invention;

FIG. 5 is a cross sectional view taken along the plane indicated by 5—5 in FIG. 4;

FIG. 6 is an exploded view illustrating the attachment of the struts of the present invention to the remote end of the paradrogue canopy;

FIG. 7 is a side elevational view illustrating one of the cord connectors utilized in the present invention to interconnect the struts of the preferred embodiment; and FIG. 8 is a perspective view illustrating the interconnection of the struts in the preferred embodiment.

DETAILED DESCRIPTION OF THE INVENTION

Figure 1:
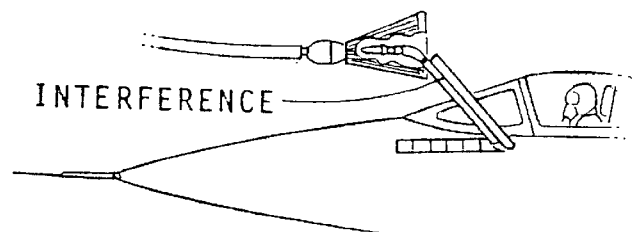
FIG. 1 is a schematic drawing showing the interference encountered with prior art paradrogue assemblies.
Figure 2:
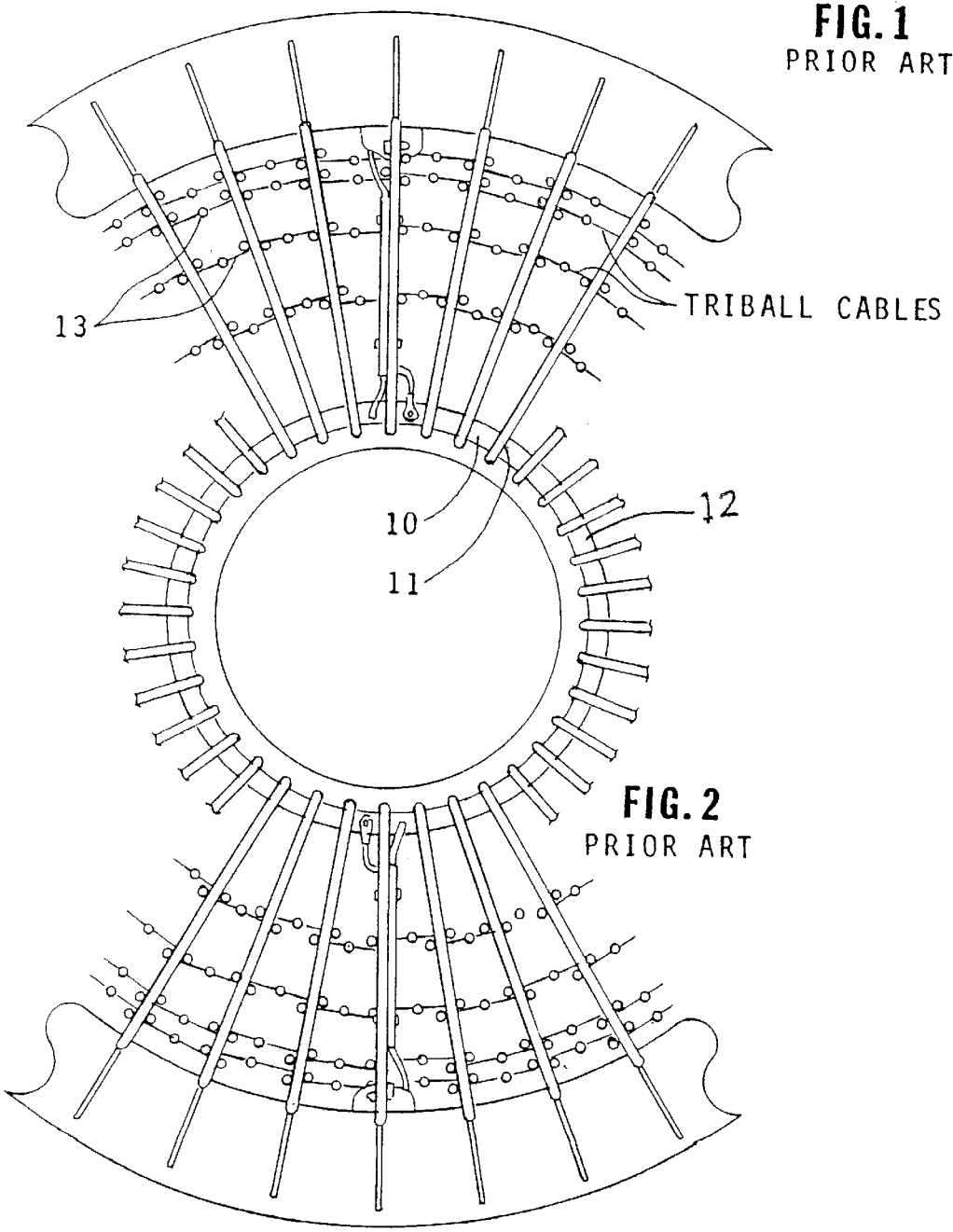
FIG. 2 is a top plan view of a prior art paradrogue assembly.

Referring to the Figures, FIGS. 1–3 illustrate the prior art. FIG. 1 shows how interference with the pilot's view is experienced with certain prior art devices having relatively long strut arms. FIG. 2 illustrates the interconnection of the struts with tri-ball cables and the running of the ring 10 through holes 11 formed in the ends of the struts in devices of the prior art which has the disadvantages discussed above. FIG. 3 illustrates a strut of the prior art having a hole 11 at its end for receiving the interconnecting ring 10 and utilizing a bulb for lighting.

Referring now to FIGS. 4–8, a preferred embodiment of the present invention is illustrated. Canopy 15 is supported on a plurality of spaced apart struts 17 which run completely around the canopy. The canopy is fabricated of parachute material. The remote ends of the struts have hook members 17b formed thereon as shown in FIG. 6. The hook members 17b are attached to the wide end of the canopy by means of brackets 18 and screws 19 which pass through clips on the bracket, clip members 17b and the wide end of the canopy (see FIG. 7). Nuts 20 are employed to retain the screws in position.

As shown in FIGS. 7 and 8, high strength nylon cords 22 are employed to interconnect the struts 17. These cords pass through holes 17c formed in the struts and have loops at their opposite ends which are installed on brackets 24. The brackets are attached to the struts 17 by means of bolts 26 and nuts 27 as shown in FIG. 8.

The base or narrow end 15a of the canopy 15 is attached to circular metallic base support member 30 which has a ring 31 thereon. As shown in FIGS. 4 and 5, hooks 17a formed on the bottom ends of the struts 17 are hooked onto ring 31, and if need be can readily be removed therefrom.

Referring to FIG. 5, an LED light 35 is installed in the struts, this light being enclosed in a hard plastic case and being less prone to breakage than prior art bulb lights.

While the device has been described and illustrated in detail, this is intended by way of illustration and example only and not by way of limitation, the spirit and scope of the invention being limited only by the terms of the following claims.

I claim:

1. A paradrogue assembly having a canopy supported on a plurality of spaced apart struts running completely around the canopy, said struts each having at least one aperture formed therein, said canopy having a narrow base end and a wide end, the improvement comprising:

a plurality of cords having loops formed in the ends thereof, each of said cords passing through an aperture of a separate one of said struts, a separate bracket associated with each of said struts, the ends of said loops being installed on said brackets, and means for attaching each of said brackets to its associated strut.

2. The paradrogue assembly of claim 1 wherein said canopy has a ring running around the base end thereof and further including a hook on one end of each of said struts which engages said ring in retention thereon.

3. The paradrogue assembly of claim 2 and further including a second set of hooks on the ends of said struts opposite said one end thereof, and means for attaching said second set of hooks to the wide end of said canopy.

4. A method for removably attaching the canopy of a paradrogue assembly to supporting struts having apertures formed therein which run around said canopy comprising the steps of:

forming a plurality of cords with loops at the opposite ends thereof;

passing each of said cords through an aperture in one of said struts;

installing the loops of each cord on a bracket, and attaching each of the brackets to a separate one of said struts.

5. The method of claim 4 wherein said assembly has a base end and a ring running around said base end, and including the further step of attaching one end of each of said struts to said ring in removable retention thereon.

6. The method of claim 5 wherein said canopy has a wide end opposite said base end and including the further step of attaching the end of each of struts opposite said one end thereof to the wide end of said canopy.

7. A paradrogue assembly having a canopy supported on a plurality of spaced apart struts running completely around the canopy, said struts each having at least one aperture formed therein, said canopy having a narrow base end, a ring running around said base end and a wide end, the improvement comprising:

a plurality of cords having loops formed in the opposite ends thereof, each of said cords passing through an aperture of a separate one of said struts, a separate bracket associated with each of said struts, the ends of said loops being installed on said brackets, means for attaching each of the brackets to its associated strut, a ring running around the base end of said canopy, hooks formed on one end of said struts which engage said ring in retention thereon, a second set of hooks on the end of said struts opposite said one end thereof, and means for attaching said second set of hooks to the wide end of said canopy.

* * * * *